April 23, 1940.    H. G. OTT    2,198,014
OPTICAL SYSTEM
Filed July 22, 1937    2 Sheets-Sheet 1

INVENTOR
Harry G. Ott
BY
Parker, Prockuow & Farmer
ATTORNEYS

April 23, 1940.  H. G. OTT  2,198,014
OPTICAL SYSTEM
Filed July 22, 1937  2 Sheets-Sheet 2
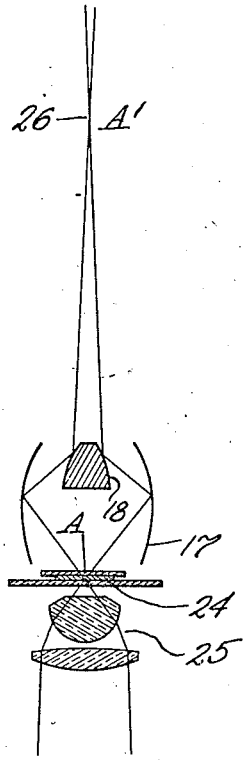
Fig. 4.
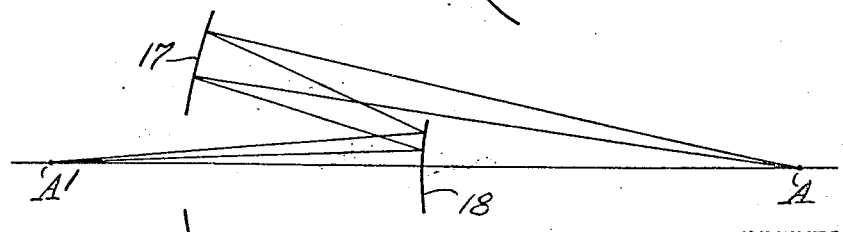
Fig. 5.
Fig. 6.
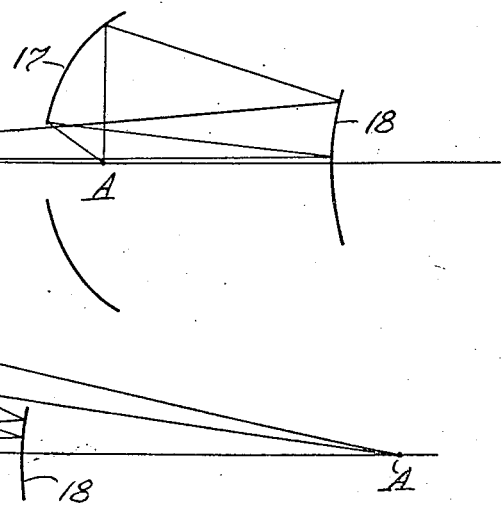
INVENTOR
Harry G. Ott
BY
Parker, Brockwow & Farmer
ATTORNEYS Patented Apr. 23, 1940

2,198,014

UNITED STATES PATENT OFFICE 2,198,014

OPTICAL SYSTEM

Harry G. Ott, Kenmore, N. Y.

Application July 22, 1937, Serial No. 154,991

9 Claims. (Cl. 88—24)

This invention relates to optical systems and more particularly to an image forming device for an optical system such as may be employed, by way of example, in headlights of motor vehicles, in optical projection apparatus and as an objective of a microscope.

One object of the invention is to provide an improved optical system for forming an image of a source of light, having a large angular aperture heretofore unattainable with freedom from color, spherical aberration and coma.

Another object of the invention is to provide an improved image forming device for an optical system, with which an image of a source of light or any object may be formed with a minimum loss of light intensity and with freedom from chromatic aberration and a minimum of coma.

Another object of the invention is to provide an improved headlight for motor vehicles in which a maximum concentration of light from a given source may be obtained on a given area, with which glare to approaching drivers may be eliminated or reduced to such an extent as to be non-objectionable, which will not materially increase the space occupied by present day headlights, and which will be relatively simple and inexpensive.

Other objects and advantages will be apparent from the following description of several embodiments of the invention, and the novel features will be particularly pointed out hereinafter in connection with the appended claims.

In the accompanying drawings:

Fig. 4 is an optical diagram illustrating the application of the invention to image magnifying devices, such as a microscope, where the improved system is used as the objective of the magnifying device; and Figs. 5 and 6 are diagrams illustrating other applications of the same improved optical system.

Figure 1:
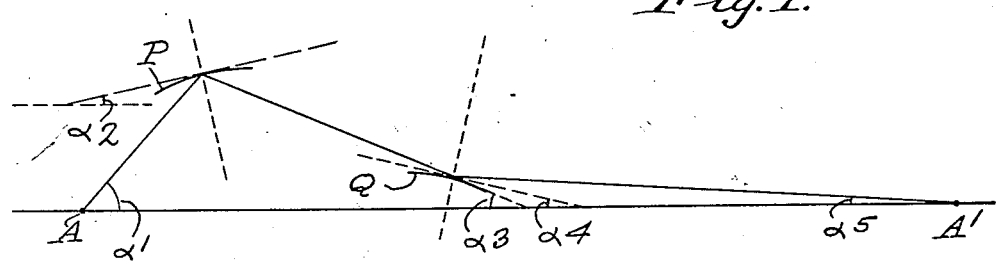
Fig. 1 is an optical diagram illustrating optical principles and explaining some of the basic equations referred to in the specification.

In optical systems for the creation of an image of a source of light, if a large angle of illumination at the source is used, considerable difficulty has been encountered in bringing all of the rays of light from the source accurately to a focus to form an image of the source, with the result that the image is either blurred or if the source of light is a filament the image includes an area of concentrated light and an encircling area of lesser intensity which is caused by spherical aberration and/or coma. Throughout this specification and claims, a source of light is considered to include a primary or initial source of light, such as a filament of an electric lamp or the center of an arc in an arc lamp, or an object illuminated from an exterior source, the light rays reflected from which object are brought to a focus so as to form an image of the illuminated object. In a headlight or projection device, the source of light will, of course, be the filament or primary source of light, whereas in a magnifying device, such as a microscope, the source of light will be the illuminated object to be magnified, and the expression "source of light" in the claims is to be interpreted in accordance with this explanation.

The size of an image formed by an optical system is dependent upon the focal length of the system. The focal length of any system will vary over its aperture if the optical aberration, known as coma, is not corrected. To illustrate, a simple lens system may be corrected for spherical aberration, and therefore form an image in the same place by both the central zone and the annular peripheral zone of the lens, but if coma or sine condition is not corrected, these two zones will form images of different sizes.

In lens systems, the difference in focal length for different zones across the aperture is a small percentage of the axial focal length. In the parabolic reflector, however, the variation in focal length for different zones is great, running up to two or three hundred percent. This means that in a headlight using a parabolic reflector, the outer zones of the reflector form images of the filament on the road that are one-half to one-third the size of the image formed by the axial zone. Since the greatest concentration of light is at the center of this series of overlapping images, this portion must be directed on the road at a considerable distance from the car. When this is done, the larger images are large enough to throw light into the eyes of the driver of an approaching car. It is this sine condition or coma error of the parabolic reflector that makes the problem of glare control so acute, since the parabolic reflector, corrected for spherical aberration, which means that all of its zones form an image of the filament at infinity, is almost universally used. The lenses used in conjunction with the parabolic reflector are attempts to correct the bad effect introduced by the coma error, although in the usual headlight engineering parlance, this is not so stated. That these lenses are only a partial solution to the problem seems evident on casual observation.

The glare problem can be solved if an optical system can be designed that will put enough light on the road, in a properly restricted area. Such an optical system must be corrected for both spherical aberration and coma or sine condition. The size of the area illuminated can be controlled by the size of the filament and the focal length of the optical system, since the image of the filament is formed far enough away from the car to be considered at infinity with reference to the optical system. Because of the fact that the filament is small in comparison to the focal length of the optical system, a correction for both spherical abberration and coma insures a good image of the filament on the road. It follows that all of the light will pass through this image, and none will wander outside its limits. Therefore, if the image is of such a size and so directed as to illuminate the road, but at a height below the eyes of the approaching driver, no light will enter his eyes and cause glare.

In the practice of my invention, I use what may be termed a double reflecting system, in which substantially all the utilized light from the source is subjected to at least two reflections in forming the image. I will, therefore first discuss those principles of such double reflection which have to do with this invention.

These double reflecting systems utilize two reflecting surfaces, P and Q (Fig. 1) small sections only of which are shown in the drawing. By means of these two surfaces, light is directed from the point or source A to the image or point A'. Each value of the angle $\alpha_1$ will determine a separate point on each of the reflecting surfaces, in conjunction with additional conditions to be stated later. The problem is to determine those forms or shapes of these reflectors that will satisfy the condition already imposed, of directing the light from A to A', and additional conditions that may or can be imposed.

The first condition which requires reflection from A to A' can be stated mathematically from the well known law of reflection in the two equations:

1. $\qquad \alpha_2 = \frac{1}{2}(\alpha_1 + \alpha_3)$

2. $\qquad \alpha_4 = \frac{1}{2}(\alpha_3 + \alpha_5)$ with due regard to the signs of the angles.

The tangents of $\alpha_2$ and $\alpha_4$ are the slopes of the two surfaces at the points in question, and are therefore the $dy/dx$ of these two curves.

Expanding Equations 1 and 2 in terms of the tangents of the angles, the following equations are obtained.

3.
$$\tan \alpha_2 = \frac{\tan \alpha_1 + \tan \alpha_3}{\sqrt{1+\tan^2 \alpha_1}\sqrt{1+\tan^2 \alpha_3} - \tan \alpha_1 \tan \alpha_3 + 1}$$

4.
$$\tan \alpha_4 = \frac{\tan \alpha_3 + \tan \alpha_5}{\sqrt{1+\tan^2 \alpha_3}\sqrt{1+\tan^2 \alpha_5} - \tan \alpha_3 \tan \alpha_5 + 1}$$

If $a$ is the distance from A to A', and A is chosen as the center of coordinates, then $$\tan \alpha_1 = \frac{y_2}{x_2}$$

$$\tan \alpha_3 = \frac{y_2 - y_4}{x_2 - x_4}$$

$$\tan \alpha_5 = \frac{y_4}{x_4 - a}$$

Where $x_2, y_2$ are the coordinates of the larger curve and $x_4, y_4$ are the coordinates of the smaller curve. Putting these values in Equations 3 and 4, the following equations are obtained, to wit:

5.
$$\frac{dy_2}{dx_2} = \frac{y_2(x_2-x_4) + x_2(y_2-y_4)}{\sqrt{x_2^2+y_2^2}\sqrt{(x_2-x_4)^2+(y_2-y_4)^2} - y_2(y_2-y_4) + x_2(x_2-x_4)}$$

6.
$$\frac{dy_4}{dx_4} = \frac{y_4(x_2-x_4) + (x_4-a)(y_2-y_4)}{\sqrt{(x_4-a)^2+y_4^2}\sqrt{(x_2-x_4)^2+(y_2-y_4)^2} - y_4(y_2-y_4) + (x_4-a)(x_2-x_4)}$$

In this manner two equations in the rectangular coordinates of the two unknown curves are obtained, each equation containing the coordinates of both curves. To obtain a solution to the problem it is necessary to obtain two equations, the one containing only the coordinates of the one curve and the other only the coordinates of the other curve. At present there are only two equations with five variables, since $a$ will vary for each ray, and three of these five variables, must be eliminated. Therefore, two more equations, or conditions, are required to reach a discrete solution. These two conditions can be chosen at will. If ease of manufacture is of first importance, then probably the best choice is to designate each surface as a sphere, or circle in the plane of the diagram, since the spherical surface is much the easiest of all surfaces to manufacture.

If, however, perfection of image formation at the point A' is a major requirement, then the condition of correction of one or two of the well known optical aberrations can be imposed. If only one aberration is corrected, either one of the reflectors can be made a sphere, and the other will be of a shape indicated by the equation derived after the desired condition is stated mathematically and proper and necessary eliminations carried out.

If both curves are designated as circles in the plane of the figure, the following two equations can be written:

7. $\qquad (x_2-b)^2 + y_2^2 = r_2^2$

8. $\qquad (x_4-c)^2 + y_4^2 = r_4^2$ where $b$ and $c$ are the distances from A of the centers of the two circles, and $r$ has its usual meaning. This may appear to be a statement of the solution to the problem at the start, since expressions for the shapes of the two reflecting surfaces are the requirement of this work. It is, however, possible to eliminate three of the four $x$'s and $y$'s between Equations 5, 6, 7 and 8 and thereby obtain an expression involving $a$, and the other $x$ or $y$, which would give an indication of the spherical aberration of the system. With certain values of the constants, $b, c, r_2, r_4$ the variation of $a$ would be small enough to make a practical system. This is shown by the fact that one type of dark field illuminator now on the market consists of such a reflecting system composed of two spherical surfaces. In general, however, such a system is usable only for narrow limits of the values of the constants and also for a relatively limited range of values of $\alpha_1$ wherever its application requires a reasonably good optical correction.

If the optical aberration commonly known as spherical aberration is corrected, not only must $a$ be a constant, but also the total length of path from A to A' must be equal for all possible paths, as is well known among those technically informed on the subject. Therefore when the spherical aberration is corrected, the condition of equal paths becomes 9. $\sqrt{x_2^2+y_2^2}+\sqrt{(x_2-x_4)^2+(y_2-y_4)^2}+$
$\sqrt{(x_4-a)^2+y_4^2}=K_1$ where $K_1$ is a constant, and this becomes one of the two additional conditions needed for a discrete solution. The other condition can be chosen at will. Making either one of the two surfaces a sphere would probably be desirable. A system meeting conditions 5, 6 and 9 would produce a good image of the point A at A'. It would not, however, necessarily produce a good image at A' of an object having finite size even though the object should be very small. In order to produce a good image of a finite but small object the coma or condition known as the sine condition must be met. Stated mathematically, the sine condition is 10. $\dfrac{\sin \alpha_1}{\sin \alpha_5}=K_2$ where $K_2$ is a constant. It is the magnification of the system if the point A' is in finite space. If A' lies at infinity, $\sin \alpha_5=0$, and the expression for sine condition correction becomes 11. $\dfrac{y_4}{\sin \alpha_1}=K_3=F$ where $K_3$ is a constant and is equal to the focal length of the system. Both 10 and 11 are well known relations that can be found in any standard work on optics. If M is used to denote the magnification of the system, 10 can be written.

12. $M=\dfrac{y_2}{y_4}\dfrac{\sqrt{(x_4-a)^2+y_4^2}}{\sqrt{x_2^2+y_2^2}}$ or if $a$ is infinite, the sine condition becomes 13. $F=\dfrac{y_4}{y_2}\sqrt{x_2^2+y_2^2}$ In some cases it might be desirable to have $K_1$, $K_2$ or $K_3$, or any combination, vary rather than remain constant. This variation can be expressed as any arbitrary function of any of the variables in the problem. If $x_2$ is chosen as the variable, then the most general form of expression is 14. $\sqrt{x_2^2+y_2^2}+\sqrt{(x_2-x_4)^2+(y_2-y_4)^2}+$
$\sqrt{(x_4-a)^2+y_4^2}=f_1(x_2)$ 15. $\dfrac{y_2}{y_4}\dfrac{\sqrt{(x_4-a)^2+y_4^2}}{\sqrt{x_2^2+y_2^2}}=f_2(x_2)M_0$ 16. $\dfrac{y_4}{y_2}\sqrt{x_2^2+y_2^2}=f_3(x_2)F_0$ where $f_1(x_2)$, $f_2(x_2)$ and $f_3(x_2)$ are any arbitrary functions of $x_2$ that may be chosen to meet conditions imposed on the problem, and $K_0$, $M_0$ and $F_0$ are initial values of these quantities, these values also being arbitrarily designated to meet desired conditions.

Equations 5, 6, 14 and 15 give a complete solution to the problem of designing two reflecting surfaces having any desired correction for both spherical aberration and sine condition. If A' is in finite space, expressions for $x_4$ and $y_4$ can be obtained from 14 and 15 and these put into 5. This will result in a differential equation for the larger curve. This equation must be integrated and solved, point by point to plot the curve. A corresponding procedure will give the other curve. This is an extremely complicated procedure. It is quicker and easier to use the following method to get the coordinates of these curves.

When $x_2=0$
$\alpha_1=90°$
$\sin \alpha_1=1.0$ and Equation 15 becomes

17. $\dfrac{\sqrt{(x_4-a)^2+y_4^2}}{y_4}=f_2(x_2)M_0$

Since the process of eliminating the variables mentioned above results in a differential equation, another constant will be introduced when this equation is integrated. This constant can be taken as the value of $x_4$ when $x_2=0$. Let this be designated by $x$. Then 18. $y_4=\dfrac{\pm(x-a)}{\sqrt{f_2(x_2)M_0-1}}$ This designates three of the four coordinates. The value of $y_2$ can be computed from 14, or, since the numerical value of $f_1(x_2)K_0$ may not be of any real importance at this point, $y_2$ can be given an arbitrary value and the starting value of $f_1(x_2)K_0$ can be determined by 14. This gives a point on each curve to meet the condition of correction for sine condition and spherical aberration. It remains to make these two points meet the necessary condition of reflection, as expressed in 5 and 6, but also expressed in 1 and 2 in simpler terms. $\alpha_2$ has been designated as 90°.

$\tan \alpha_3 = \dfrac{y_2-y_4}{x_2-x_4}$ but for the points in question $\tan \alpha_3 = \dfrac{y_2-y_4}{-x}$ so that 19. $\alpha_2 = 45° + \tfrac{1}{2}\tan^{-1}\dfrac{y_2-y_4}{-x}$ 20. $\tan \alpha_2 = \dfrac{dy_2}{dx_2}$ Similarly 21. $\alpha_4 = \tfrac{1}{2}\tan^{-1}\dfrac{y_2-y_4}{-x}+\tfrac{1}{2}\tan^{-1}\dfrac{y_4}{x-a}$ 22. $\tan \alpha_4 = \dfrac{dy_4}{dx_4}$ Equations 19 and 21 require these points on each curve to meet the conditions of reflection as stated in Equations 1 and 2, and they are therefore points on the pair of curves, the pair meeting the conditions stated in Equations 1, 2, 14 and 15. These are points on the curves that are the loci of the two equations that could be derived from the four Equations 5, 6, 14 and 15 as described at the top of page.

Equations 20 and 22 afford the means of proceeding to the next point. Since the start of the method was the designation of the initial value of $x_2$, an arbitrary value of $dx_2$ in Equation 20 is used, and since the value of $\tan \alpha_2$ is known, the value of $dy_2$ can be computed. This is used as though it correctly designated the new $y_2$. This is not strictly correct, since this $y_2$ is on the tangent to the curve at the starting point, and therefore lies off the true curve by the amount that this tangent recedes from the curve at the new value of $x_2$. This error is disregarded at first and corrected later in a manner to be described.

From the work already done the first ten $\alpha_5$ can be computed by $$\tan \alpha_5 = \frac{y_4}{x-2}$$

Since the new $x_2$ and $y_2$ are now known, the new $\sin \alpha_1$ can be computed by $$\sin \alpha_1 = \frac{y_2}{\sqrt{x_2^2 + y_2^2}}$$

and the new $\sin \alpha_5$ by $$\sin \alpha_5 = \frac{\sin \alpha_1}{f_2(x_2) M_0}$$

From this the value of $\tan \alpha_5$ can be obtained, and subtracted from the previous value of $\tan \alpha_5$ to get $d(\tan \alpha_5)$. Since $$\tan \alpha_5 = \frac{y_4}{(x_4 - a)}$$

differentiation gives $$\tan \alpha_5 dx_4 + (x_4 - a) d(\tan \alpha_5) = dy_4$$

and it has been shown previously that $$dy_4 = dx_4 \tan \alpha_4$$

therefore $$dx_4 = \frac{(x_4 - a) d(\tan \alpha_5)}{\tan \alpha_4 - \tan \alpha_5}$$

These last two equations of $dx_4$ and $dy_4$ give the means of getting the new point on the small curve, $x_4$ and $y_4$.

This pair of new points meets three of the four conditions stated, since the new $\alpha_2$ and $\alpha_4$ are computed as before to meet the conditions of reflection, and the sine condition correction is obtained by virtue of the method used. There is, however, nothing in this method to insure that these points will satisfy Equation 14, which is a statement that the spherical aberration is to be corrected. The next step is to put these new values of the coordinates in Equation 14 and compute the new value of $f_1(x_2) K_0$. Because of the error mentioned above, this new value will be slightly in error. A small arbitrary correction to $dy_2$ must be made, and the process repeated, until the value of $f_1(x_2) K_0$ is close enough to the required value for all practical purposes. After this has been done a few times for several points the proper amount of correction to give to $dy_2$ can be estimated with ease.

When the proper correction to $dy_2$ is found, this new pair of points lie on the pair of curves that satisfy the four conditions stated, and the remarks at the top of page apply here also. In this way the whole pair of curves can be derived, with as much accuracy as though a single equation for each curve were developed and solved, and with much less work.

The example given is worked out for an infinite value of $a$. In this case there are certain obvious simplifications of the equations and procedure. $f_1(x_2)$ and $f_2(x_2)$ are given the constant value of one. The value of $x$, which positions the two curves with respect to each other is given a value of 80 mm., and $F_0$ is made 20 mm. The value of $y_2$ when $\alpha_1 = 90°$ is 40 mm.

It should be noted that when this process is carried to its ultimate conclusion of a perfect correction, an optical system is obtained that is perfectly corrected for spherical aberration and sine condition, and since only reflections are involved it is also perfectly corrected for color, and these perfect corrections cover an extremely large angular aperture. This is a definite improvement over the usual lens system type of image forming device, since all lens systems suffer from small residual aberrations that cannot be eliminated, and when the angular aperture is large these residual aberrations cause a noticeable deterioration of the quality of the image.

This system is a definite improvement over the usual types of reflecting systems used in some optical devices which consist of either a parabola or ellipse or hyperbola, because even though these systems are corrected for spherical aberration and color, they have so much coma as to seriously interfere with their performance.

The pair of points used as the start of the corrected differential method of computation has a definite significance. As $\alpha_1$ changes from 90° by swinging the ray from A to the right in the diagram, the angle remains positive. If, however, the ray is swung into the left-hand quadrant $\alpha_1$ becomes negative. Since by 10

$$\sin \alpha_5 = \frac{\sin \alpha_1}{K}$$

it is seen that when $\alpha_1$ changes sign, $\alpha_5$ must also change sign if K is to remain constant. This, in turn, means that A' must lie to the left of the small curve instead of as shown in the figure. To accomplish this, the slope of the small curve must change abruptly. In other words there is a point of discontinuity at the point on the small curve corresponding to the point on the large curve where $\alpha_1 = 90°$. If $\alpha_1$ is changed in one direction from this value, one set of curves is obtained, and quite a different set if $\alpha_1$ is changed in the other direction. There are, therefore, at least two classes of combinations of these curves. The first is illustrated by Figs. 2, 3 and 4 and the second by Fig. 5.

Figure 2:
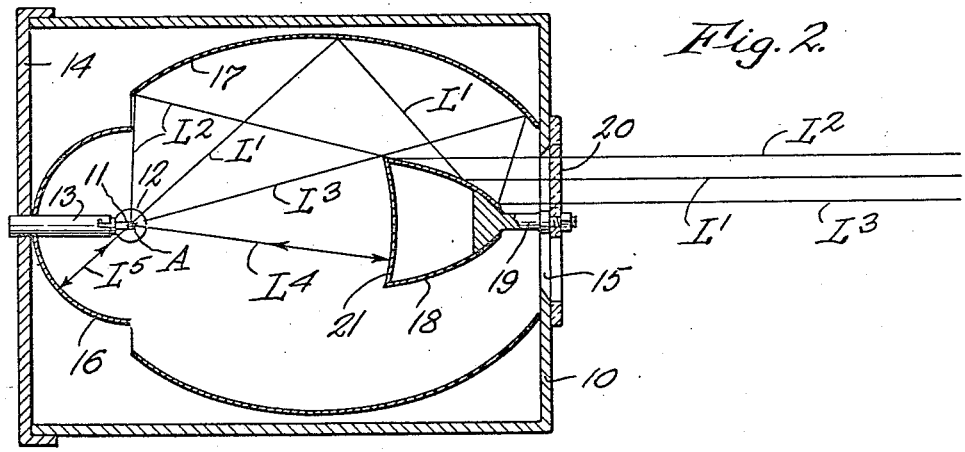
Fig. 2 is a sectional elevation through a motor vehicle headlight constructed in accordance with this invention, and illustrating one application of the broad features of the invention.
Figure 3:
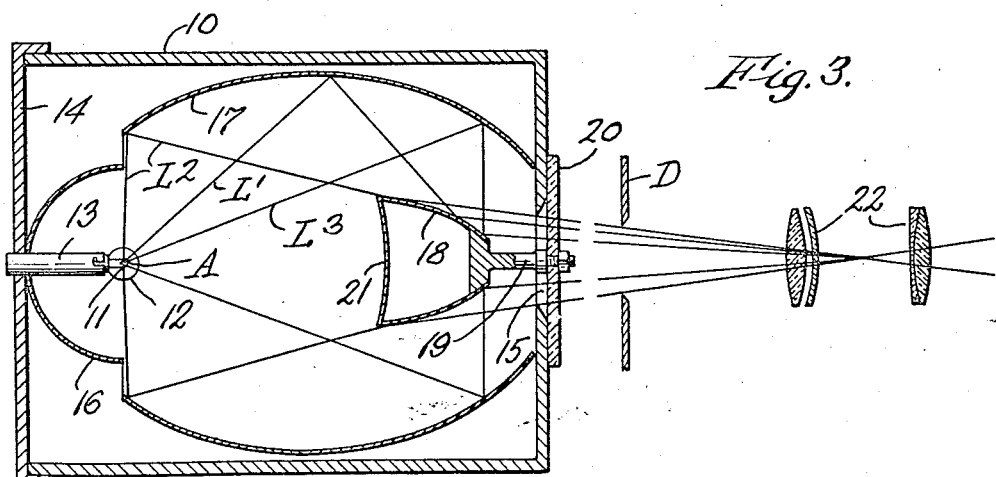
Fig. 3 is an optical diagram illustrating the application of the invention to an optical projection condensing system, such as for motion picture machines or stereoptican projection devices.

The differentiation between these two classes lies in the fact that in Figs. 2, 3 and 4 the object and image are on opposite sides of the small curve and in Fig. 5 they lie on the same side. Perhaps a more significant differentiation lies in the fact that in Figs. 2 to 4 all values of $\alpha_1$ lie wholly in the first quadrant and in Fig. 5 all values of $\alpha_1$ lie in the second quadrant. Since object and image are interchangeable, the point A must be defined as the point furnishing light to the large mirror, and A' the point furnishing light to or receiving it from the small mirror.

If the point A is moved to the right, beyond the small reflector, in Fig. 5, the combination as shown in Fig. 6 is obtained.

If the point A is moved to the right to infinity, this is a combination useful for telescopes. It should be noted here that there is another, equally valid, way of designating the difference between Figs. 2 to 4 and Fig. 6. If the point A in Figs. 2 and 3 is moved out to the left, the useful part of the larger reflector at its right-hand end is increased. If a large part of the left-hand end of this larger reflector is also removed, Fig. 6 is duplicated except that the procedure gives a diagram that is reversed right and left from Fig. 6. When the above alterations of Figs. 2 and 3 are made, and point A moved to the left to infinity, a combination suitable for telescopes is again reached.

All three of these classes of combinations can be altered to make the light rays from the larger reflector cross the axis before striking the small reflector. Such procedure serves to invert the image, and such combinations are useful wherever this is desired. In this case the small reflector becomes concave instead of convex. If this is done for the arrangement of Figs. 2 to 4, only 180° about the axis can be used or otherwise one half of the small reflector would shield the light from the other half.

Referring now to Fig. 2, I have illustrated one application of the invention to a headlight for motor vehicles. In that embodiment of the invention, the improved headlight includes a casing 10 of any suitable construction and of any desired shape. The source of light is a filament 11 of an electric light bulb 12 which is supported in any suitable or usual manner by a socket 13 that in turn is supported in any suitable manner, such as from the removable rear wall 14 of the housing. The front wall of the housing is provided with a suitable window or aperture 15 through which light from the source 11 is projected. A semi-spherical, concave mirror 16 is disposed about the socket 13 at the rear of the housing, and the center of curvature of the inner face of the mirror is substantially at the center of the filament 11. Therefore, any light rays from the filament 11 which, upon leaving the filament travel rearwardly and impinge upon the mirror 16, will be reflected by the spherical mirror 16 back along the same radius to that mirror, and through the filament and thence forwardly in the housing 10.

Within the housing 10 is a relatively large, concave reflector or mirror 17 which may be tubular and have a surface of revolution, although this invention is not limited to a surface of revolution, for in some cases a departure from such a surface is desirable, the axis of revolution of which is substantially coincident with the line between the center of the filament 11 and the center of the aperture or window 15. This concave reflector 17 preferably extends at one end approximately to a plane through the filament 11 and normal to the axis of revolution of the reflecting surface of reflector 17. The particular curvature of the reflecting surface of this concave tubular reflector is selected or determined by the method hereinbefore explained. Within the housing 10 but further along the axis of reflector 17 is a second and smaller, but convex reflector 18 which is disposed across said axis adjacent to the aperture 15, and this convex reflector 18 also has a surface of revolution, with its axis coincident with the axis of generation of the reflector 17, as its reflecting surface, and progressing generally in the same direction as the axis of reflector 17. Thus the convex reflector 18 is within and has its reflecting surface facing the tubular concave reflector 17, adjacent the aperture 15.

This reflector 18 may be supported in any suitable manner, such as by having at its smaller or forward end, a small stud 19 which extends therefrom forwardly through the window or aperture 15 and through a small spider frame or transparent plate 20 carried by the front end of the housing 10 and spanning the aperture or window 15. This frame 20 supports the reflector 18 and if a spider, it should be as small as possible so as to obstruct the passage of only a minimum of light, or, if desired, it can be so shaped and positioned as to reflect, refract or direct some light out of the path directed by the optical system, but if it is a plate of glass, it serves to close the front end of the housing, that is, the aperture or window 15 therein. That end of the convex reflector 18 which is nearest the source of light 11 may be made of any desired curvature, but it is preferably coated with a light absorptive coating so that any light rays striking the same will be largely absorbed instead of reflected.

Typical light rays $L_1$, $L_2$, $L_3$, $L_4$, $L_5$, are illustrated, by way of example, as leaving the filament 11, and the paths of such rays are indicated in Fig. 2. The light ray $L_1$ leaving the filament 11 strikes the concave reflector 17 intermediate of its ends and is reflected thereby inwardly and forwardly against the convex reflector 18 and thence forwardly through the aperture or window 15 at the front of the housing. The ray $L_2$ strikes the concave reflector 17 at the rearward end thereof, and is reflected forwardly thereby against the rear or innermost end of the reflector 18, and thence forwardly through the aperture or window 15. The light ray $L_3$ leaving the filament 11 and passing forwardly at a small angle to the axis of the reflector 17 just clears the rear or inner end of the reflector 18 and strikes the forward end of the reflector 17 and is there reflected backwardly against the forward end of the reflector 18, and thence forwardly through the aperture or window 15.

The light ray $L_4$ is an example of that small bundle of the light rays which leave the filament 11 and directly impinge upon the inner end 21 of the reflector 18, and such rays are either absorbed or reflected back to the filament. Preferably this end wall 21 is made partially spherical, with the center of curvature at the filament, so that if any of the rays of light impinging on this surface 21 are not absorbed they will be reflected back to the filament instead of being reflected to the reflector 17 where they might be reflected in a manner that would cause them to leave the window 15 and cause glare. The light rays, of which $L_5$ is an example, which leave the filament 11 and pass rearwardly to impinge upon the semi-spherical reflector 16 will, by reason of the fact that the center of curvature of that reflector is at the filament, be reflected back to the filament and thence will travel in a manner forwardly to impinge upon the reflector 17 in the same manner as though those light rays had originally travelled forwardly in the same direction from filament 11. Thus, the ray $L_5$ after reflection will travel forwardly along with the ray $L_1$, for example.

From these examples it will be observed that all the rays of light from the filament 11 which are allowed to leave the window or aperture 15 of the housing will be subjected to at least two major reflections, one by the concave reflector 17 to the convex reflector 18, and then by the latter forwardly through the aperture or window 15 of the housing. If the curvature of the reflector 17 and 18 is corrected for spherical aberration and also for coma or sine condition there will be a maximum concentration of light from the filament 11 at the image on the roadway in advance of the headlight and there will be no appreciable amount of separate rays which can cause glare to the driver of an approaching vehicle. About the only rays of light which are lost and which are not utilized are those included in the small bundle of rays which initially impinge upon the end 21 of the convex reflector 18, and this bundle of rays will be relatively small, so that maximum but controlled illumination will be obtained by this device.

It will be observed that the forward end of reflector 17 subtends a bundle of light rays from the filament which is substantially the same bundle which is subtended by the inner end surface 21 of reflector 18, so that substantially no direct and unreflected light rays from the filament can escape through the window 15 and cause glare. It will also be noted that the reflector 17 has a relatively large reflecting surface and subtends a relatively large angle at the filament, and that the reflector 18 has a relatively small reflecting surface and subtends a relatively small angle at the filament.

It will also be observed that the reflector with the convex face subtends a relatively small angle at the source or the filament, and has a relatively small angular aperture at the image of the source; also that the reflector with the concave face subtends a relatively large angle at said source or filament. The angular aperture is the angle formed at the axial point of the object or image between the axis and the ray having the greatest inclination to the axis, that can enter or leave the system, providing none of the rays between the axis and this extreme ray are obstructed by the system. If such an obstruction occurs, then the angular aperture is the angle of the hollow cone of rays permitted to enter or leave the system.

In Fig. 3 the application of this type of device to an optical projection system is illustrated. In this embodiment of the invention the source of light and the reflectors may be provided, the same as in Fig. 2, except that the reflected rays leaving the convex reflector 18 will be more convergent and brought to a focus approximately at the projection lenses 22. The converging light rays pass through any lantern slide or film at the aperture or frame D and then through the usual projection lens device 22 so as to project an image of the slide or film upon a screen, as usual in optical projection apparatus of this type.

In Fig. 4 the application of this invention to a magnifying device, such as a microscope, is illustrated. Light from any suitable source is concentrated upon an object mounted on a microscope slide 24, in any suitable manner such as by means of the usual microscope condensing system 25, and the object on the slide 24 which is thus illuminated corresponds to the source of light provided by the filament 11 in the optical system of Figs. 2 and 3. It is the light rays reflected by the object so illuminated that are doubly reflected by the reflectors 17 and 18 in the manner explained in connection with Figs. 2 and 3, and the twice reflected rays are thus brought to a focus as at 26 where an image of the object on the slide 24 is produced. A suitable eye piece, not shown, may be disposed at approximately the focus 26 for magnifying the image produced by the objective as usual in microscopes and the like.

Other applications of the invention will be apparent to those skilled in the art from the foregoing examples, and it will be observed that unusually complete control of the light rays is obtained and maximum concentration of light at the focus is obtained in all of the various applications.

In Figs. 5 and 6, different arrangements of the reflectors 17 and 18 are illustrated diagrammatically, the arrangement on only one side of the optical axis of the system being shown, so that it will be understood that in practice, the reflectors may extend on both sides of the axis in the same manner.

It will be understood that various changes in the details which have been herein described and illustrated in order to explain the nature of the invention may be made by those skilled in the art within the principle and scope of the invention, as expressed in the appended claims.

I claim:

1. An image forming device for an optical system, such as for light projecting devices and microscope objectives, comprising an outer concave mirror and a smaller convex mirror, a source of light disposed at a finite distance from said concave mirror, said concave mirror subtending a relatively large angle at said source and said convex mirror subtending a relatively small angle at said source and having a relatively small angular aperture at the image of said source, the mirrors forming an optical system upon an optical axis and being of such a shape that the curves formed by the intersection of the surfaces and a plane through the axis consist of corresponding pairs of points, each pair satisfying the conditions expressed by the equations;

$$\sqrt{x_2^2+y_2^2}+\sqrt{(x_2-x_4)^2+(y_2-y_4)^2}+$$
$$\sqrt{(x_4-a)^2+y_4^2}=K \text{ (a constant)}$$

and $$\frac{y_2}{y_4}\frac{\sqrt{(x_4-a)^2+y_4^2}}{\sqrt{x_2^2+y_2^2}}=M \text{ (a constant)}$$

or $$\frac{y_4}{y_2}\sqrt{x_2^2+y_2^2}=F \text{ (a constant)}$$

when $a$ is infinite, and the slopes of the curves at these points being such that $$\alpha_2=\tfrac{1}{2}(\alpha_1+\alpha_3)$$

and $$\alpha_4=\tfrac{1}{2}(\alpha_3+\alpha_5)$$

in which equations:

$x_2$ and $y_2$ are the coordinates of the concave curve, $x_4$ and $y_4$ are the coordinates of the convex curve, $\alpha_1$ is the angle between said optical axis and a ray of light from said source and directly incident on said concave mirror, $\alpha_2$ is the angle between the tangent to the concave mirror at the point of incidence thereon of said ray and a parallel to said optical axis, $\alpha_3$ is the angle between the ray of light reflected from said concave mirror and said optical axis, $\alpha_4$ is the angle between the tangent to the convex mirror at the point of incidence thereon of the reflected ray of light from said concave mirror and said optical axis, and $a$ is the distance from said source to said image.

2. An image forming device for an optical system comprising an outer concave mirror and a smaller convex mirror, a source of light disposed at a finite distance from said concave mirror, said concave mirror subtending a relatively large angle at said source and said convex mirror subtending a relatively small angle at said source and having a relatively small angular aperture at the image of said source, the mirrors being of such a shape that the curves formed by the intersection of the surfaces and a plane through the axis consist of corresponding pairs of points, each pair satisfying the conditions expressed by the equations, $$\sqrt{x_2^2+y_2^2}+\sqrt{(x_2-x_4)^2+(y_2-y_4)^2}+\sqrt{(x_4-a)^2+y_4^2}=f_1(x_2)$$

and $$\frac{y_2}{y_4}\frac{\sqrt{(x_4-a)^2+y_4^2}}{\sqrt{x_2^2+y_2^2}}=f_2(x_2) M_0$$

or $$\frac{y_4}{y_2}\sqrt{x_2^2+y_2^2}=f_3(x_2) F_0$$

when $a$ is infinite, and the slopes of the curves at these points being such that $$\alpha_2=\tfrac{1}{2}(\alpha_1+\alpha_3)$$

and $$\alpha_4=\tfrac{1}{2}(\alpha_3+\alpha_5)$$

in which equations:

$x_2$ and $y_2$ are the coordinates of the concave curve, $x_4$ and $y_4$ are the coordinates of the convex curve, $\alpha_1$ is the angle between said optical axis and a ray of light from said source and directly incident on said concave mirror, $\alpha_2$ is the angle between the tangent to the concave mirror at the point of incidence thereon of said ray and a parallel to said optical axis, $\alpha_3$ is the angle between the ray of light reflected from said concave mirror and said optical axis, $\alpha_4$ is the angle between the tangent to the convex mirror at the point of incidence thereon of the reflected ray of light from said concave mirror and said optical axis, $a$ is the distance from said source to said image, $f_1(x_2)$, $f_2(x_2)$ and $f_3(x_2)$ are any arbitrary functions of $x_2$ that may be chosen to meet conditions imposed on the problem, and $M_0$ and $F_0$ are initial values of these quantities arbitrarily designated to meet desired conditions.

3. An image forming device for an optical system comprising a pair of spaced reflecting surfaces, a source of light disposed at a finite distance from one of said reflecting surfaces, said one surface subtending a relatively large angular aperture at said source, and the other of said surfaces subtending a relatively small angle at said source and having a relatively small angular aperture at the image of said source, the two surfaces being in a plane section through the axis, the approximate loci of the differential equations $$\frac{dy_2}{dx_2}=\frac{y_2(x_2-x_4)+x_2(y_2-y_4)}{\sqrt{x_2^2+y_2^2}\sqrt{(x_2-x_4)^2+(y_2-y_4)^2}-y_2(y_2-y_4)+x_2(x_2-x_4)}$$

$$\frac{dy_4}{dx_4}=\frac{y_4(x_2-x_4)+(x_4-a)(y_2-y_4)}{\sqrt{(x_4-a)^2+y_4^2}\sqrt{(x_2-x_4)^2+(y_2-y_4)^2}-y_4(y_2-y_4)+(x_4-a)(x_2-x_4)}$$

said surfaces being arranged with respect to each other as indicated by the values of the constants of integration of these equations, in which equations:

$x_2$ and $y_2$ are the coordinates of the concave curve, $x_4$ and $y_4$ are the coordinates of the convex curve, and $dx_2$, $dy_2$, $dx_4$ and $dy_4$ are increments of change of $x_2$, $y_2$, $x_4$ and $y_4$ respectively.

4. An improved, image forming optical device comprising a source of light, a double reflecting, image forming optical system with an optical axis and having a concave, arcuate reflector subtending a relatively large angle at said source and a convex, arcuate reflector subtending a relatively small angle at said source, said system having said source in said axis at one focus in finite space and said reflectors arranged along said axis and forming an image of said source at another point along said axis by double reflection of all light passing along said axis as far as said image, first from one reflector and then from the other reflector to said image, said source being finite, and said reflectors having their reflecting surfaces as a combination corrected for both spherical aberration, and coma as expressed by the sine condition, in the image.

5. An improved, image forming optical device of the type useful for headlights, projection apparatus, and microscopes, comprising a source of light, a double reflecting, lens free, image forming optical system with a straight optical axis and having a concave, arcuate reflector subtending a relatively large angle at said source and a convex, arcuate reflector subtending a relatively small angle at said source, said system having said source in said axis at one focus in finite space and said reflectors arranged along said axis and forming an image of said source at another point along said axis by double reflection of all light passing along said axis as far as said image, first from one reflector and then from the other reflector to said image, said source being finite and small in comparison to the focal length of the system, and said reflectors having their reflecting surfaces as a combination corrected for both spherical aberration, and coma as expressed by the sine condition, in the image, said system having an opaque wall disposed across said axis and of an area to limit light passing along said axis from said source towards said image, to that pencil of light rays which is subtended by said concave reflector.

6. An improved, image forming optical device of the type useful for headlights, projection apparatus, and microscopes, comprising a source of light, a double reflecting, lens free, image forming optical system with a straight optical axis and having a concave, arcuate reflector subtending a relatively large angle at said source and a convex, arcuate reflector subtending a relatively small angle at said source, said system having said source in said axis at one focus in finite space and said reflectors arranged along said axis and forming an image of said source at another point along said axis by double reflection of all light passing along said axis as far as said image, first from one reflector and then from the other reflector to said image, said source being finite, and said reflectors having their reflecting surfaces as a combination corrected for both spherical aberration, and coma as expressed by the sine condition, in the image, said system having an opaque wall disposed across said axis and of an area to limit light passing along said axis from said source as far as said image, to that pencil of light rays which is subtended by said concave reflector, and a spherical type concave reflector concentric to said source, and disposed across said axis at the side of said source opposite from said concave reflector for reflecting back through said source substantially all direct light from said source which is incident thereon, whereby said light which is reflected back through the source will travel forwardly along said axis in the same manner as the direct light travelling in that direction from said source.

7. An improved, image forming optical device of the type useful for headlights, projection apparatus, and microscopes, comprising a source of light, a double reflecting, lens free, image forming optical system with a straight optical axis and having a concave, arcuate reflector subtending a relatively large angle at said source and a convex, arcuate reflector subtending a relatively small angle at said source, said system having said source in said axis at one focus in finite space and said reflectors arranged along said axis and forming an image of said source at another point along said axis by double reflection of all light passing along said axis as far as said image, first from one reflector and then from the other reflector to said image, said source being finite and small in comparison to the focal length of the system, and said reflectors having their reflecting surfaces as a combination corrected for both spherical aberration, and coma as expressed by the sine condition, in the image, said system having an opaque wall disposed across said axis and of an area to limit light passing along said axis from said source to said image, to that pencil of light rays which is subtended by said concave reflector, both of said reflectors representing surfaces of revolution, with said optical axis as the axis of generation of said surfaces, and with one end of said concave reflector extending approximately to a plane through said source and normal to said axis, and with said convex reflector being disposed approximately in the space between the ends of said concave reflector, measured along said axis.

8. An improved, image forming optical device comprising a source of light, a double reflecting, lens free, image forming optical system with a straight optical axis and having a concave, arcuate reflector subtending a relatively large angle at said source and a convex, arcuate reflector subtending a relatively small angle at said source, said system having said source in said axis at one focus in finite space and said reflectors arranged along said axis and forming an image of said source at another point along said axis by double reflection of all light passing along said axis as far as said image, first from one reflector and then from the other reflector to said image, said source being finite, and said reflectors having their reflecting surfaces as a combination corrected for both spherical aberration, and coma as expressed by the sine condition, in the image, and a spherical type concave reflector concentric to said source, and disposed across said axis at the side of said source opposite from said concave reflector for reflecting back through said source substantially all direct light from said source which is incident thereon, whereby said light which is reflected back through the source will travel forwardly along said axis in the same manner as the direct light travelling in that direction from said source.

9. An improved image forming device comprising a finite source of light, a double reflecting, image forming optical system with an optical axis and having a concave, arcuate reflector and a convex, arcuate reflector, said system having said source in said axis at one focus in finite space and said reflectors being axially aligned and arranged along said axis and subtending angles at said source sufficient to reflect all light from said source passing along said axis as far as said image, first from one reflector and then from the other to form said image at another point along said axis by double reflection, and said reflectors having their reflecting surfaces as a combination corrected both for spherical aberration, and for coma as expressed by the sine condition in the image.

HARRY G. OTT.